(12) United States Patent
Liu et al.

(10) Patent No.: US 12,417,762 B2
(45) Date of Patent: Sep. 16, 2025

(54) SPEECH-TO-TEXT VOICE VISUALIZATION (71) Applicant: International Business Machines Corporation, Armonk, NY (US)

(72) Inventors: Ju Ling Liu, Beijing (CN); Xiang Wei Li, Beijing (CN); Dong Chen, Beijing (CN); Ye Chuan Wang, Beijing (CN); Ting Ting Zhan, Beijing (CN); Wei Yan, Beijing (CN); Yu An, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 17/719,543

(22) Filed: Apr. 13, 2022

(65) Prior Publication Data

US 2023/0335123 A1 Oct. 19, 2023

(51) Int. Cl.
*G10L 15/187* (2013.01)
*G06T 11/20* (2006.01)
(Continued)

(52) U.S. Cl.
CPC .......... *G10L 15/187* (2013.01); *G06T 11/203* (2013.01); *G10L 15/04* (2013.01); *G10L 15/22* (2013.01); *G10L 25/63* (2013.01)

(58) Field of Classification Search
CPC ....... G10L 15/187; G10L 15/04; G10L 15/22; G10L 25/63; G10L 13/033; G10L 21/003; G10L 21/12; G06T 11/203
(Continued)

(56) References Cited

U.S. PATENT DOCUMENTS 10,459,686 B1* 10/2019 Lenke ................ G06F 3/165
11,404,087 B1* 8/2022 Khalilia ............. G06V 40/171
(Continued)

FOREIGN PATENT DOCUMENTS

CN 108305611 A 7/2018
CN 112967720 A 6/2021
(Continued)

OTHER PUBLICATIONS

Cai et al., "Audio-Textual Emotion Recognition Based on Improved Neural Networks", Hindawi, Research Article | Open Access, vol. 2019, Article ID 2593036, https://doi.org/10.1155/2019/2593036, Published Dec. 31, 2019, 17 pages.
(Continued)

*Primary Examiner* — Thuykhanh Le
(74) *Attorney, Agent, or Firm* — Daniel M. Yeates (57) ABSTRACT

A computer-implemented method for generating personalized audio data is disclosed. The computer-implemented method includes receiving user input data, wherein the user input data is at least one of text or audio. The computer-implemented method further includes segmenting the user input data into a set of sentences. The computer-implemented method further includes generating, for each sentence in the set of sentences, a voice image, wherein the voice image includes at least one pronunciation tag and wave line associated with a sentence. The computer-implemented method further includes modifying the user input data based, at least in part on, the wave line and pronunciation tag of the voice image.

17 Claims, 7 Drawing Sheets

(51) Int. Cl.
*G10L 15/04* (2013.01)
*G10L 15/22* (2006.01)
*G10L 25/63* (2013.01)

(58) Field of Classification Search
USPC .......................................................... 704/232
See application file for complete search history.

(56) References Cited

U.S. PATENT DOCUMENTS

| | | | | |
|---|---|---|---|---|
| 11,526,541 | B1* | 12/2022 | Chadwick | G06F 40/30 |
| 2003/0023443 | A1* | 1/2003 | Shizuka | G10L 13/00 |
| | | | | 704/260 |
| 2005/0131673 | A1* | 6/2005 | Koizumi | G06F 40/47 |
| | | | | 704/E15.015 |
| 2005/0257667 | A1* | 11/2005 | Nakamura | G10L 13/033 |
| | | | | 704/E13.004 |
| 2006/0004569 | A1* | 1/2006 | Yoshioka | G10L 13/033 |
| | | | | 704/E13.004 |
| 2008/0077387 | A1* | 3/2008 | Ariu | G10L 15/22 |
| | | | | 704/E15.04 |
| 2012/0046949 | A1* | 2/2012 | Leddy | G10L 13/033 |
| | | | | 704/260 |
| 2014/0303957 | A1* | 10/2014 | Lee | G06F 40/58 |
| | | | | 704/2 |
| 2015/0213812 | A1* | 7/2015 | Sasaki | G10L 21/034 |
| | | | | 704/211 |
| 2016/0021334 | A1* | 1/2016 | Rossano | G10L 13/033 |
| | | | | 704/2 |
| 2016/0086597 | A1* | 3/2016 | Matsubara | G10L 13/0335 |
| | | | | 704/243 |
| 2018/0158447 | A1* | 6/2018 | Maziewski | G10L 13/033 |
| 2019/0089550 | A1* | 3/2019 | Rexach | A47K 5/1217 |
| 2019/0147870 | A1* | 5/2019 | Taki | G10L 15/22 |
| | | | | 704/233 |
| 2019/0196666 | A1* | 6/2019 | Kurzweil | G06F 3/0482 |
| 2019/0251965 | A1* | 8/2019 | Dharne | G06V 40/174 |
| 2019/0392814 | A1* | 12/2019 | Kayama | G10L 13/0335 |
| 2020/0035260 | A1* | 1/2020 | Whitman | G10L 15/18 |
| 2020/0042285 | A1* | 2/2020 | Choi | G10L 25/84 |
| 2020/0122046 | A1* | 4/2020 | Nocon | G06F 16/683 |
| 2020/0286506 | A1 | 9/2020 | Deshpande | |
| 2021/0011545 | A1* | 1/2021 | Min | H04M 1/72409 |
| 2021/0026923 | A1* | 1/2021 | Dalce | G10L 15/005 |
| 2021/0097976 | A1* | 4/2021 | Chicote | G10L 13/10 |
| 2021/0097980 | A1* | 4/2021 | Lezzoum | G10L 13/033 |
| 2021/0151046 | A1* | 5/2021 | Nicholson | G10L 15/26 |
| 2021/0183358 | A1* | 6/2021 | Mao | G10L 17/04 |
| 2021/0224319 | A1* | 7/2021 | Ingel | G06F 16/686 |
| 2021/0233031 | A1* | 7/2021 | Preuss | G06F 3/011 |
| 2021/0264929 | A1* | 8/2021 | Osebe | G10L 21/003 |
| 2021/0287657 | A1* | 9/2021 | Deng | G06F 40/30 |
| 2021/0343270 | A1* | 11/2021 | Zhang | G10L 15/08 |
| 2022/0185111 | A1* | 6/2022 | Biswal | H04R 1/08 |
| 2023/0062598 | A1* | 3/2023 | Nathan | H04R 1/08 |
| 2023/0096543 | A1* | 3/2023 | Moy | G06F 40/58 |
| | | | | 704/3 |
| 2023/0110905 | A1* | 4/2023 | Shih | G10L 25/90 |
| | | | | 704/232 |
| 2023/0136393 | A1* | 5/2023 | Abokela | A61B 5/121 |
| | | | | 704/232 |
| 2023/0143883 | A1* | 5/2023 | Bai | G10L 21/02 |
| | | | | 704/200 |
| 2023/0197093 | A1* | 6/2023 | Morrison | G10L 15/02 |
| | | | | 704/232 |
| 2023/0317090 | A1* | 10/2023 | Hiroshiba | G10L 21/04 |
| | | | | 704/200 |
| 2024/0021183 | A1* | 1/2024 | Iriyama | G10G 1/00 |
| 2024/0070251 | A1* | 2/2024 | Maizels | G10L 13/02 |
| 2024/0339105 | A1* | 10/2024 | Kanagawa | G10L 13/06 |
| 2025/0173415 | A1* | 5/2025 | Maizels | H04R 1/028 |

FOREIGN PATENT DOCUMENTS

| | | |
|---|---|---|
| CN | 113221560 A | 8/2021 |
| WO | 2017104875 A1 | 6/2017 |
| WO | 2021051598 A1 | 3/2021 |

OTHER PUBLICATIONS

Cai et al., "Emotion Controllable Speech Synthesis Using Emotion-Unlabeled Dataset With the Assistance of Cross-Domain Speech Emotion Recognition", IEEE International Conference on Acoustics, Speech and Signal Processing (ICASSP), 2021, 5 pages.

Cho et al., "Multi-speaker Emotional Text-to-speech Synthesizer", INTERSPEECH 2021: Show & Tell Contribution, Aug. 30-Sep. 3, 2021, Brno, Czechia, 2 pages.

Liu et al., "Reinforcement Learning for Emotional Text-to-Speech Synthesis with Improved Emotion Discriminability", INTERSPEECH 2021, Aug. 30-Sep. 3, 2021, Brno, Czechia, 5 pages.

Mell et al., "The NIST Definition of Cloud Computing", Recommendations of the National Institute of Standards and Technology, NIST Special Publication 800-145, Sep. 2011, 7 pages.

Zhou et al., "Emotional Voice Conversion: Theory, Databases and ESD", arXiv:2105.14762v1 [cs.CL] May 31, 2021, 33 pages.

* cited by examiner

SPEECH-TO-TEXT VOICE VISUALIZATION

BACKGROUND

The present invention relates generally to the field of speech-to-text, and more particularly to, generating a voice image associated with text converted from speech.

Speech to text and text to speech are commonly used in Artificial Intelligence (AI). When converting speech to text or vice versa, the emotion or meaning of words often get lost in the conversion. CN113221560A "provides a personality trait and emotion prediction method, device, computer equipment and medium, which can simultaneously predict personality trait and emotion and improve the accuracy of personality trait and emotion prediction." Similarly, US20200286506A1 "relates generally to speech signal processing, and more particularly to a method and system for processing speech signal for emotion identification. The system processes a speech signal collected as input, during which a plurality of differential features corresponding to a plurality of frames of the speech signal are extracted. Further, the differential features are compared with an emotion recognition model to identify at least one emotion matching the speech signal, and then the at least one emotion is associated with the speech signal."

In different speaking languages, native speakers use different intonations, stress accents, and speed to express different emotions and meanings. For example, serial reading and swallowing sounds may commonly be used to make the speech smoother and more native sounding. However, neither US20200286506A1 nor CN113221560A are able to machine regenerate text from speech with different intonations or native speaking techniques corresponding to the converted text in a visual manner. Similarly, neither US20200286506A1 nor CN113221560A are able to regenerate speech from text in a language that is native to a particular individual. Accordingly, there is a need for current AI systems to be able to recognize such linguistic and language subtitles in order to discern the emotions and meanings expressed from speech, and therefore, how to machine regenerate speech from text or vice versa with different intonations and native speaking techniques.

SUMMARY

According to one embodiment of the present invention, a computer-implemented method for generating personalized audio data is disclosed. The computer-implemented method includes receiving user input data, wherein the user input data is at least one of text or audio. The computer-implemented method further includes segmenting the user input data into a set of sentences. The computer-implemented method further includes generating, for each sentence in the set of sentences, a voice image, wherein the voice image includes at least one pronunciation tag and wave line associated with a sentence. The computer-implemented method further includes modifying the user input data based, at least in part on, the wave line and pronunciation tag of the voice image. The disclosed computer-implemented method is advantageous by eliminating the impact of individual expression differences by identifying and generating pronunciation tags and voice images. The disclosed computer-implemented method is advantageous by converting input audio or text into personalized output audio or text.

According to another embodiment of the present invention, a computer program product for generating personalized audio data is disclosed. The computer program product includes one or more computer readable storage media and program instructions stored on the one or more computer readable storage media. The program instructions include instructions to receive user input data, wherein the user input data is at least one of text or audio. The program instructions further include instructions to segment the user input data into a set of sentences. The program instructions further include instructions to generate, for each sentence in the set of sentences, a voice image, wherein the voice image includes at least one pronunciation tag and wave line associated with a sentence. The program instructions further include instructions to modify the user input data based, at least in part on, the wave line and pronunciation tag of the voice image. The disclosed computer program product is advantageous by eliminating the impact of individual expression differences by identifying and generating pronunciation tags and voice images. The disclosed computer program product is advantageous by converting input audio or text into personalized output audio or text.

According to another embodiment of the present invention, a computer system for generating personalized audio data is disclosed. The computer system includes one or more computer processors, one or more computer readable storage media, and computer program instructions, the computer program instructions being stored on the one or more computer readable storage media for execution by the one or more computer processors. The program instructions include instructions to receive user input data, wherein the user input data is at least one of text or audio. The program instructions further include instructions to segment the user input data into a set of sentences. The program instructions further include instructions to generate, for each sentence in the set of sentences, a voice image, wherein the voice image includes at least one pronunciation tag and wave line associated with a sentence. The program instructions further include instructions to modify the user input data based, at least in part on, the wave line and pronunciation tag of the voice image. The disclosed computer system is advantageous by eliminating the impact of individual expression differences by identifying and generating pronunciation tags and voice images. The disclosed computer system is advantageous by converting input audio or text into personalized output audio or text.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of speech-to-text, and more particularly to, generating a voice image associated with text converted from speech.

Embodiments of the present invention use a voice visualization model, also referred to herein as a voice image, to carry over intonation and native speaking techniques when converting speech to text and vice versa. Embodiments of the present invention use the voice image to train a machine learning model to recognize such native linguistic specific information and regenerate speech in a smoother and more accurately fashion. Embodiments of the present invention generate a voice image as a virtual medium of speech. In an embodiment, a voice image structure includes word line, wave line and pronunciation tags. Intonation, stress accent, speed, serial reading, and swallowing sounds may also be included in the pronunciation tag. Embodiments of the present invention determine the transformation of text into text with voice elements, text into voice with user preferences, voice into voice with user preferences, and voice into text with voice elements.

Embodiments of the present invention generate voice images to visualize conversation, speech or lectures to allow users to communicate in a more native sounding dialect through a personalized emotion recognition model. Embodiments of the present invention solve the current problems in the field by using personal traits and emotions to get a more characteristic voice image, thereby eliminating the need to predict one element for another.

Embodiments of the present invention define the one to one and one to multiple relationships between voice images and emotions. Embodiments of the present invention provide for determining the elements of a voice image, including word line and pronunciation tags. Embodiments of the present invention further provide for the generation of voice image corresponding to converted text. Embodiments of the present invention receive user input of either speech or plain text and executes matching operations, and outputs speech which is customized to fit the user's voice style and personalized speech. Embodiments of the present invention also generate voice images as an output associated with converted text. In some embodiments of the present invention, linguistic tags and/or emotional tags are generated corresponding to the voice image.

Embodiments of the present invention train a machine learning model to automatically generate a voice image directory, and detect relationships between voice images and emotion which fit more with a given geographical area or individuals personal linguistic style. Embodiments of the present invention perform a second phase of training based on historical user linguistic data and speech history data in order to generate a more refined, personalized voice image dictionary that incorporates the particular word line and pronunciation tags typically used by the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
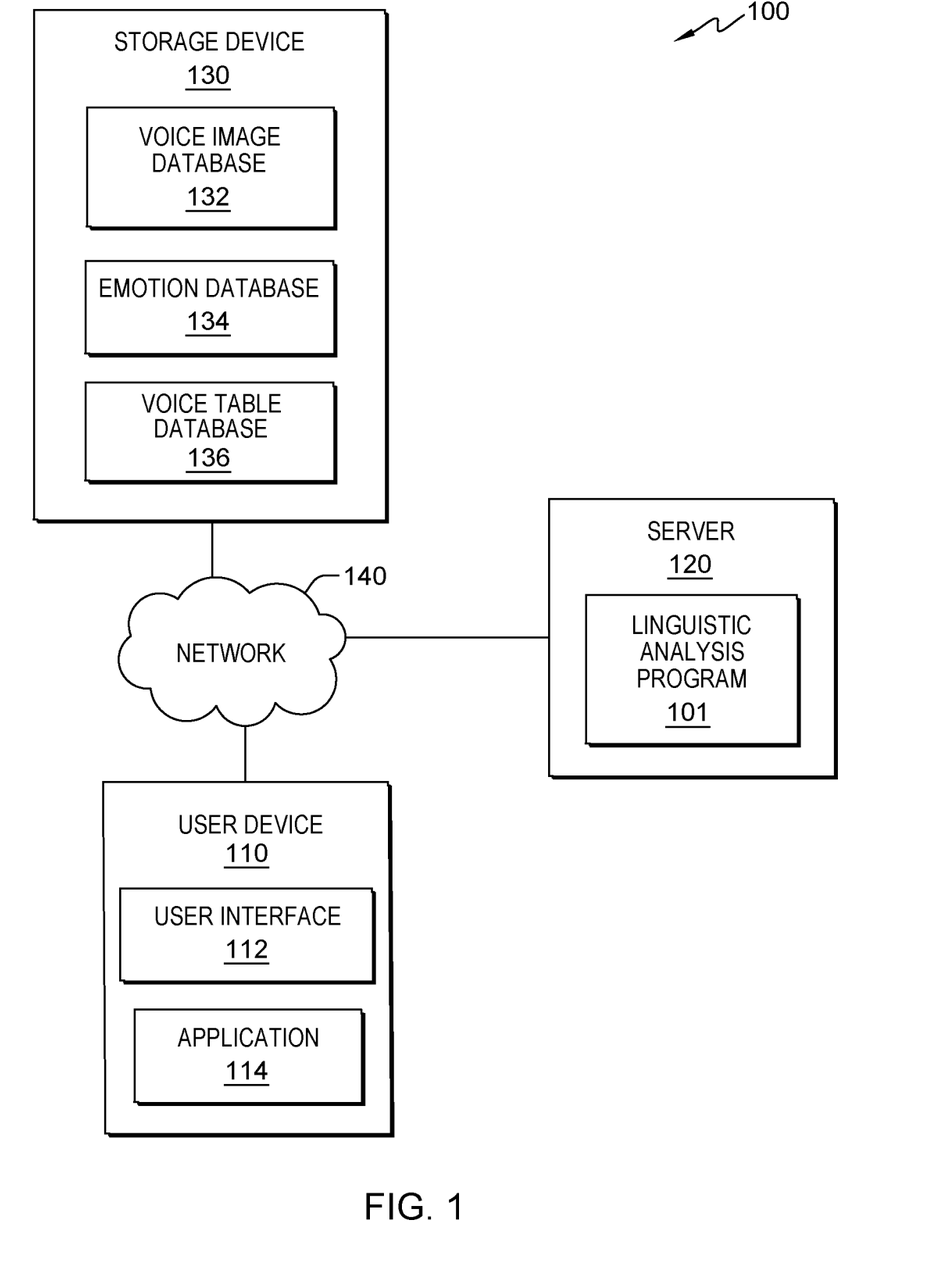
FIG. 1 is a functional block diagram of a network computing environment suitable for linguistic analysis program 101, generally designated 100, in accordance with at least one embodiment of the present invention.

The present invention will now be described in detail with reference to the Figures. FIG. 1 is a functional block diagram of a network computing environment suitable for a linguistic analysis program 101, generally designated 100, in accordance with at least one embodiment of the present invention. In an embodiment, network computing environment 100 may be provided by cloud computing environment 50, as depicted and described with reference to FIG. 6, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to computing 500 of FIG. 5.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on user device 110. In an embodiment, application 114 is representative of one or more applications (e.g., voice image application, speech to text application, text to speech application, communication application, etc.) located on user device 110. In various example embodiments, application 114 can be an application that a user of user device 110 utilizes to upload speech, audio, or text, or view a voice image. In an embodiment, application 114 can be an application that a user of user device 110 utilizes to convert speech to text or vice versa. In an embodiment, application 114 can be a client-side application associated with a server-side application running on server 120 (e.g., a client-side application associated with linguistic analysis program 101). In an embodiment, application 114 can operate to perform processing steps of linguistic analysis program 101 (i.e., application 114 can be representative of linguistic analysis program 101 operating on user device 110).

Server 120 is configured to provide resources to various computing devices, such as user device 110. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g. database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

In an embodiment, server 120 includes linguistic analysis program 101. Server 120 may include components as depicted and described in detail with respect to cloud computing node 10, as described in reference to FIG. 6, in accordance with at least one embodiment of the present invention. Server 120 may include components, as depicted and described in detail with respect to computing device 500 of FIG. 5, in accordance with at least one embodiment of the present invention.

In various embodiments, storage device 130 is a secure data repository for persistently storing voice image database 132, emotion database 134, and voice table database 136 utilized by various applications and user devices of a user, such as user device 110. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, linguistic analysis program 101 may be configured to access various data sources, such as voice image database 132, emotion database 134, and voice table database 136 that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, linguistic analysis program 101 enables the authorized and secure processing of personal data. In an embodiment, linguistic analysis program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, linguistic analysis program 101 provides information regarding personal data and the nature (e.g., type, scope, purpose, duration, etc.) of the processing. In an embodiment, linguistic analysis program 101 provides a user with copies of stored personal data. In an embodiment, linguistic analysis program 101 allows for the correction or completion of incorrect or incomplete personal data. In an embodiment, linguistic analysis program 101 allows for the immediate deletion of personal data.

In an embodiment, voice image database 132 includes various data on voice information. In an embodiment, linguistic analysis program 101 receives input audio and converts the audio to text. In an embodiment, linguistic analysis program 101 stores converted text in voice image database 132. In an embodiment, voice information includes voice images, sentences, sentence structure, emotions, sentence patterns and their relationship, if any. In an embodiment, the structure comprises the pronunciation tag, wave line, and word line. In an embodiment, a voice image is created based on one or more of the pitch (frequency), tone (waveform), loudness (amplitude) of audio. In an embodiment, a voice image is the depiction of one or more of, but not limited to, a pronunciation tag, wave line, word line, speed, swallowing, and stress accents corresponding to audio. In an embodiment, the pronunciation tag comprises information on the swallowing, speed, and stress accent word. In an embodiment, the sentence tag is an existing sentence that has been marked with emotional characteristics, for use with emotion and voice image pairing. In an embodiment, the wave line is a wavy line used to mark the height of intonation or volume of a word or sentence. In an embodiment, the word line refers to the corresponding text or word. In an embodiment, the relationship is the ratio or multiple of importance of one different information. For example, a relationship can be a 1 to 1 ration of emotion to wave line. In an embodiment, a user can customize the relationship to indicate the pronunciation tag is more important than the determined emotion. In an embodiment, a voice information assigned a higher importance is assigned a higher weight. For example, a relationship can be a 2 to 1 ratio of pitch to loudness and linguistic analysis program 101 assigns a weight twice as much to pitch than loudness. In an embodiment, voice image database 132 includes voice images generated by linguistic analysis program 101.

In an embodiment, voice image database 132 includes personalized generated audio converted from text. In an embodiment, voice image database 132 includes current images and matching images. In an embodiment, the current image is a voice image generated from the corresponding word line, wave line, and pronunciation tag from the user input. In an embodiment, a matching image is a previously generated voice image that matches the current image (i.e., the current user input) with respect to one or more word lines, wave lines or pronunciation tags. In an embodiment, voice image database 132 includes personalized audio generated by linguistic analysis program 101. In an embodiment, linguistic analysis program 101 converts audio input to personalize the audio with a user's particular inflections or characteristics of the user's native language to make it more natural sounding. In an embodiment, linguistic analysis program 101 stores the personalized audio in voice image database 132.

In an embodiment, emotion database 134 includes various emotional data associated with particular voice images. For example, emotion database 134 includes emotional categories such as anger, happiness, sadness, surprise, and neutral. In an embodiment, emotion database 134 stores emotional factors associated with particular voice image data, such as wave lines, stress accents, or pronunciation tags. In an embodiment, emotional factors are one or more factors which contribute to an emotion. For example, a certain wave line or stress accent contributes to the emotion "excited." In an embodiment, emotion database 134 includes information on one or more emotion tags. In an embodiment, an emotion tag is a tag connecting voice information to one or more emotions. In an embodiment, emotion database 134 is an emotion pool. In an embodiment, an emotion pool is a list of one or more emotions. In an embodiment, various emotion data included in emotion database 134 is updated as the machine learning model is updated.

In an embodiment, voice table database 136 is a temporary table whose life cycle begins and ends based on a particular user session. For example, voice table database 136 includes one or more sentences (either originally input as text, or converted to text from speech) during a user session and is deleted when the user session ends. In an embodiment, voice table database 136 includes wave line and pronunciation tags corresponding to individual words and sentences input during a user session. In an embodiment, voice table database 136 includes voice images corresponding to individual words and sentences input during a user session. In an embodiment, voice table database 136 includes emotional data and emotional tags associated with wave lines, pronunciation tags, and voice images corresponding to individual words and sentences input during a user session. In an embodiment, an emotional and linguistic analysis of text input into voice table database 136 is prioritized based on one more predetermined rules or predefined user preferences.

In an embodiment, the voice table database 136 has a priority list. In an embodiment, the priority list is the number, sorting, or ranking in the temporary table. In an embodiment, the sorted or ranked temporary list is the priority list. For example, linguistic analysis program 101 receives user input text and generates sentences from the text. Linguistic analysis program 101 matches the sentences to word lines and voice image and determines the sentence and voice image are a 1:1 multiple correspondence. Linguistic analysis program 101 accesses voice table database 136 to determine the temporary table. The temporary table will extract voice image items from voice image database 132 according to certain rules and sort them according to priority or weight. Linguistic analysis program 101 matches the image item with the highest weight. Here, voice image and emotion are 1:1 correspondence, which can be clearly matched to emotion.

In an embodiment, linguistic analysis program 101 automatically performs a corresponding connection operation. For example, the user only needs to input audio or text, and linguistic analysis program 101 matches a voice image and corresponding emotional to generate personalized audio for the user. As another example, the user only needs to input the voice, or combine the emotional factors to match the voice image for the user and show it to the user, optionally, introduce emotional tags. In an embodiment, linguistic analysis program 101 generates personalized audio data that conforms to the user's habits, or generate a voice image that visualizes voice elements, depending on the user's intention. In an embodiment, linguistic analysis program 101 trains an emotion model.

In an embodiment, linguistic analysis program 101 receives user input. In an embodiment, the user input is audio or text. In an embodiment, linguistic analysis program 101 converts the user audio input into text by performing speech-to-text. In an embodiment, linguistic analysis program 101 inputs the user input of sentences (video or audio) into the training model. In this training model, for each sentence, there are multiple speech to express different emotion. In an embodiment, the training model converts speech into text, and also the virtualization of the voice is generated for each sentence. [sentence SA, voice image VA1, emotion EA1], [sentence SA, voice image VA2, emotion EA2]. In an embodiment, linguistic analysis program 101 generates the speech with sentence and voice image.

In an embodiment, linguistic analysis program 101 determines the features of the user input. In an embodiment, the features of the user input include one or more of, but are not limited to, pitch, frequency, tone, waveform, loudness, amplitude, and speed of the audio data. In an embodiment, linguistic analysis program 101 breaks up the audio data into individual sentences. In an embodiment, separating the audio data into individual sentences includes applying the N-order Markov hypothesis to the audio data in order to determining the probability that each words appearance is only related to the nearest N historical words. Here, the probability that word 2 follows word 1 is calculated based on the following equation: $P(w_k|w_{1:k-1}) \approx P(w_k|w_{k-1-(N-1)})$. For example, given the following audio data "It is interesting let us try another time come one" and N is set to 2, then P(let/is interesting)<P(interesting/it is), and therefore, it can be determined that the sentence construct should be "it is interesting, let" rather than "it is interesting let,". After another iteration, it can again be determined that the sentence construct should be "It is interesting, let us try another time, come on" and so forth.

In an embodiment, linguistic analysis program 101 generates a voice image for each sentence. In an embodiment, linguistic analysis program 101 generates a voice image for each word included in each sentence. In an embodiment, the voice image is generated based on the volume or inflection points associated with each word in a sentence. In an embodiment, the volume is scaled and set to "N" levels, such that $$n_x = \left[v_x / \frac{v_{max}}{N}\right] + 1.$$

In an embodiment, linguistic analysis program 101 compares the text or audio converted to text with word line data in the voice image database 132. In an embodiment, linguistic analysis program 101 analyzes whether there are matching and associated text segments having the same word line data. In an embodiment, linguistic analysis program 101 determines one of three situations: the word line associated with sentence fragments compared to previously stored word lines is completely consistent, partially consistent, and completely inconsistent. Completely consistent means linguistic analysis program 101 determined an exact match. Partially consistent means linguistic analysis program 101 determined a partial match. Completely inconsistent means linguistic analysis program 101 did not determine any match.

In an embodiment, linguistic analysis program 101 updates the sentence list in the emotion pool. In an embodiment, the user input appears in the temporary table, that is, exactly the same situation occurs, and the corresponding image ID can be inserted into the sentence list of the corresponding emotion pool. In an embodiment, the image ID an identification number generated by linguistic analysis program 101 for each voice image. In embodiments there is not a matching item in the temporary table, linguistic analysis program 101 adds a corresponding image for the input audio and matches the image ID to the corresponding emotion group in the emotion pool.

Figure 2:
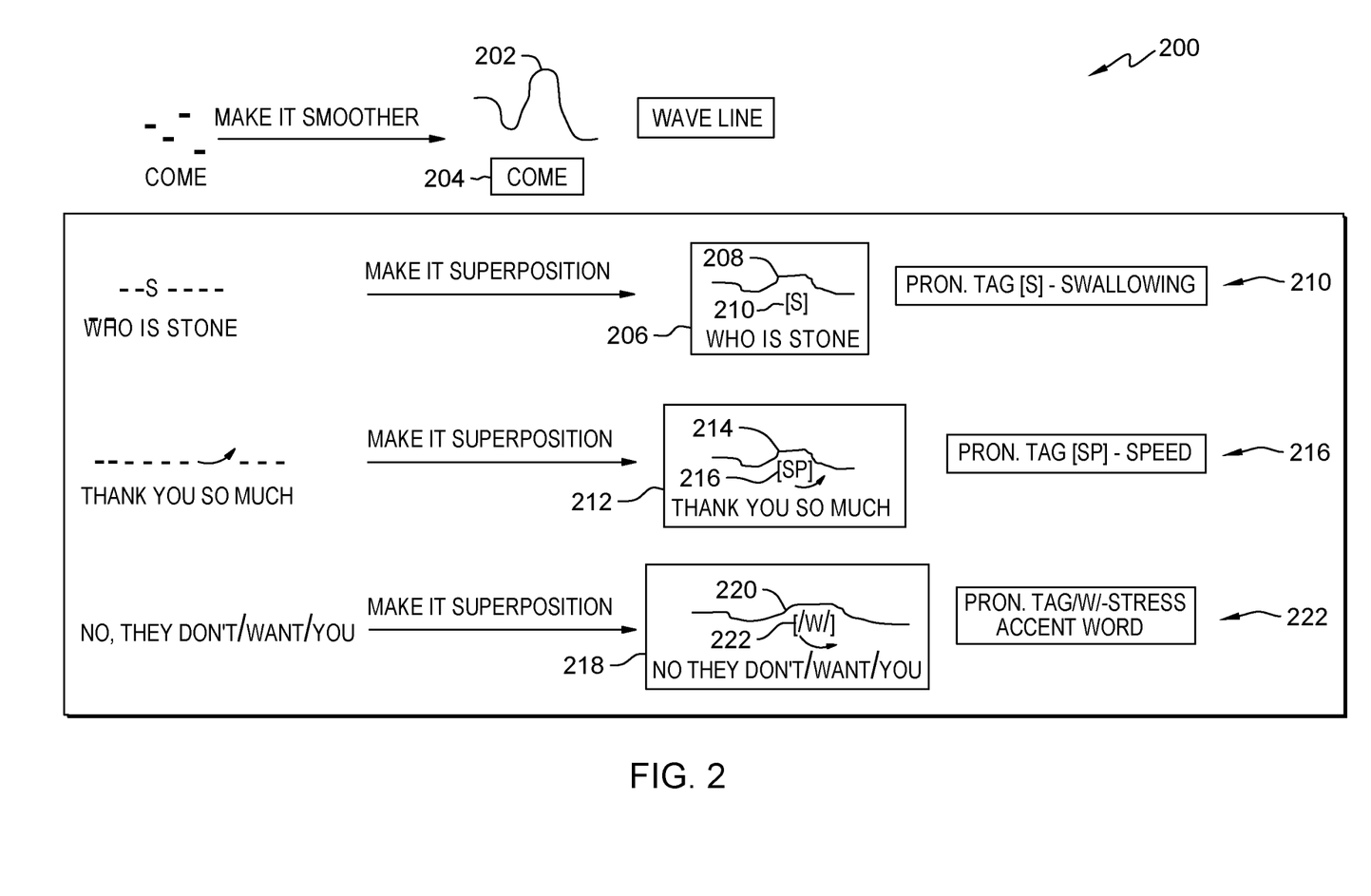
FIG. 2 is a diagram depicting a set of voice images, generally designated 200, in accordance with at least one embodiment of the present invention.

FIG. 2 is a diagram depicting a set of voice images, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, linguistic analysis program 101 generates a sentence pattern and wave line from the volume of the spoken sentence. In an embodiment, the wave line is a wavy line used to mark the height of intonation or volume of a word. In an embodiment, linguistic analysis program 101 determines the volume for each letter of a word. In an embodiment, linguistic analysis program 101 determines the volume scale by: $n_x=[v_x/(v_{max}/N)]+1$. wherein $v_{max}$ is the maximum volume and 'N' is the number of different volume levels. For example, if the word "come" is spoken, and if the maximum volume $v_{max}=50$ db, and $v_c=27$, $v_o=16$, $v_m=34$, $v_e=3$, and N=5, then linguistic analysis program generates voice image 204 for the spoken word "Come" based on inflection points 202 ($n_c=3$ $n_o=2$ $n_m=4$ $n_e=1$). In an embodiment, linguistic analysis program 101 connects the one or more inflections points to generate a wave line.

In an embodiment, linguistic analysis program 101 generates pronunciation tags for particular words or sentences in addition to wave lines. For example, as depicted in FIG. 2, the voice image 206 for the sentence "Who is Stone" includes a wave line 208 and pronunciation tag [s]—swallowing 210 that indicates a swallowing sound. As further depicted in FIG. 2, linguistic analysis program 101 has determined a swallowing sound and tags the word "is" with a swallowing pronunciation tag.

In another example, and as depicted in FIG. 2, the voice image 212 for the sentence "Thank you so much" includes a wave line 214 and pronunciation tag [sp]—speed 216. Here, linguistic analysis program 101 has determined the speed or change of speed of the input audio sentence "Thank you so much". In an embodiment, linguistic analysis program 101 tags the speed of one or more words from the input audio with a pronunciation tag. As further depicted in FIG. 2, linguistic analysis program 101 has determined an increase of speed and tags the word "so" with a speed pronunciation tag in voice image 212.

In yet another example, and as depicted in FIG. 2, the voice image 218 for the sentence "No, they don't want you" includes a wave line 220 and pronunciation tag /w/ 222 indicating a stress accent word in the input audio. In an embodiment, linguistic analysis program 101 tags one or more stress accent words from the input audio with a pronunciation tag. As further depicted in FIG. 2, linguistic analysis program 101 has determined a stress accent word and tags the word "want" with a slow speed pronunciation tag and a stress access pronunciation tag.

Figure 3:
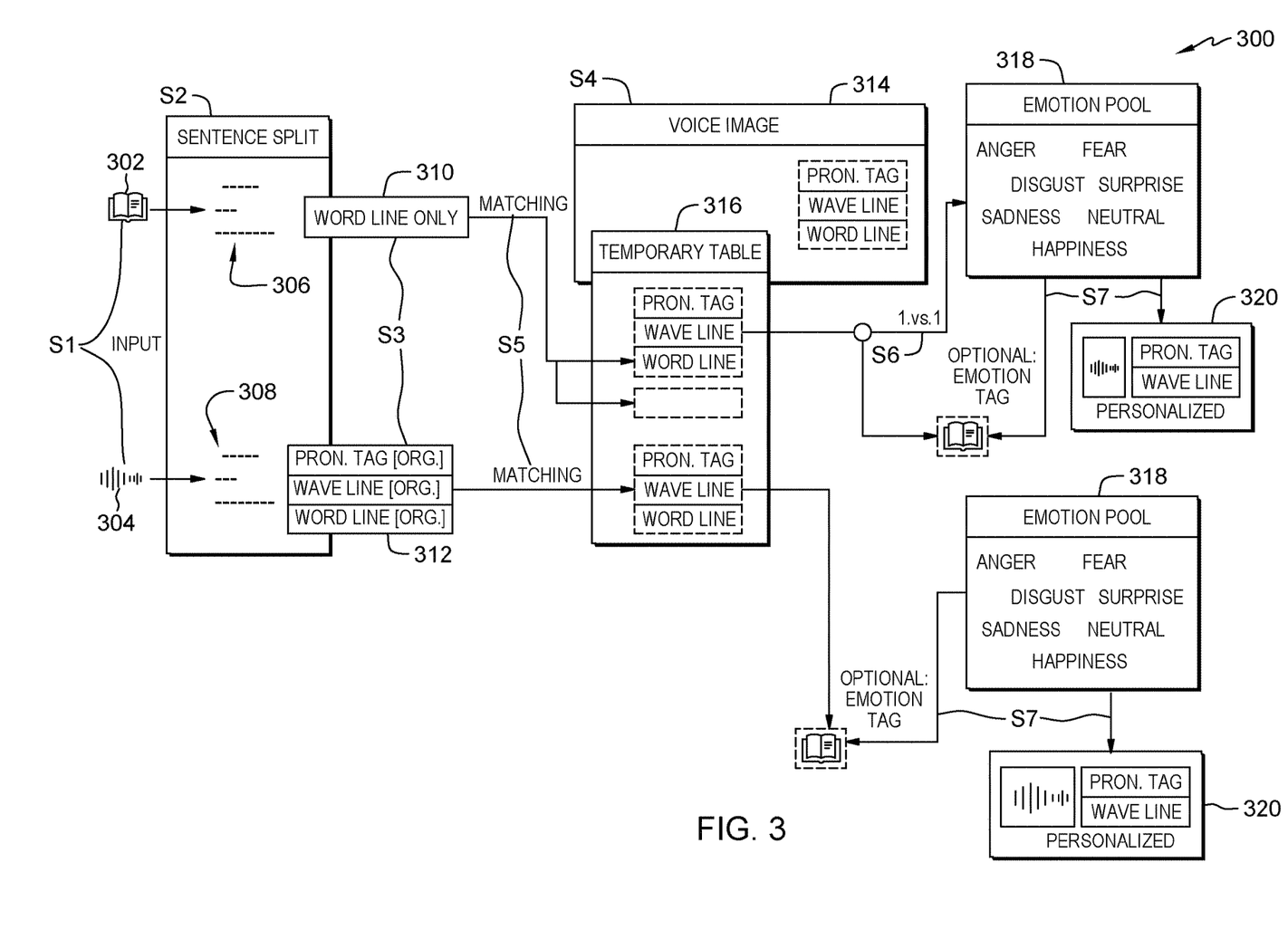
FIG. 3 is a flow chart diagram depicting operational steps by a linguistic analysis program 101 for generating personalized audio and text based content, generally designated 300, in accordance with at least one embodiment of the present invention.

FIG. 3 is a flow chart diagram depicting operational steps by a linguistic analysis program 101 for generating personalized audio and text based content, generally designated 300, in accordance with at least one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step S1, linguistic analysis program 101 receives user input either as text 302 or audio 304. In an embodiment, linguistic analysis program 101 performs speech-to-text on received audio input to generate text. At step S2, linguistic analysis program 101 segments the text into individual sentences. As depicted in FIG. 3, text 302 has been segmented into a plurality of sentences 306 and audio 304 has been segmented into a plurality of sentences 308. At step S3, linguistic analysis program 101 generates a voice image for each sentence. In an embodiment, linguistic analysis program 101 generates a voice image that includes one or more of a pronunciation tag, a wave line, and a word line. As depicted in FIG. 3, a voice image 310 containing only word lines has been generated for plurality of sentences 306. A voice image 312 containing pronunciation tags, wave lines, and word lines has been generated for plurality of sentences 308. At step S4, linguistic analysis program 101 retrieves previously generated voice images from voice image database 314 and stores the previously generated voice images in temporary table 316. In an embodiment, linguistic analysis program 101 selects voice images from voice image database 314 that have word lines with similar categories as the word lines generated for plurality of sentences 306 or 308. At step S5, linguistic analysis program 101 compares the voice images generated for plurality of sentences 306 or 308 to the voice images stored in temporary table 316 to identify matching voice images or voice images having a degree of similarity above a predetermined threshold. At step S6, linguistic analysis program selects an emotion from emotion pool 318 corresponding to a matching voice image from temporary table 316. At step S7, if the user input is text 302, linguistic analysis program 101 generates an emotion tag corresponding to the emotion selected from emotion pool 318 and tags one or more sentences of plurality of sentences 306 with the emotion tag. In an embodiment, if the user input is audio 304, linguistic analysis program 101 modifies audio 304 to include audio characteristics representative of the emotion selected from emotion pool 318. In an embodiment, if the user input is audio 304, linguistic analysis program 101 presents the voice image corresponding to audio 304 while audio 304 is played back to the user. In an embodiment, linguistic analysis program 101 generates personalized output audio or voice image 320.

Figure 4:
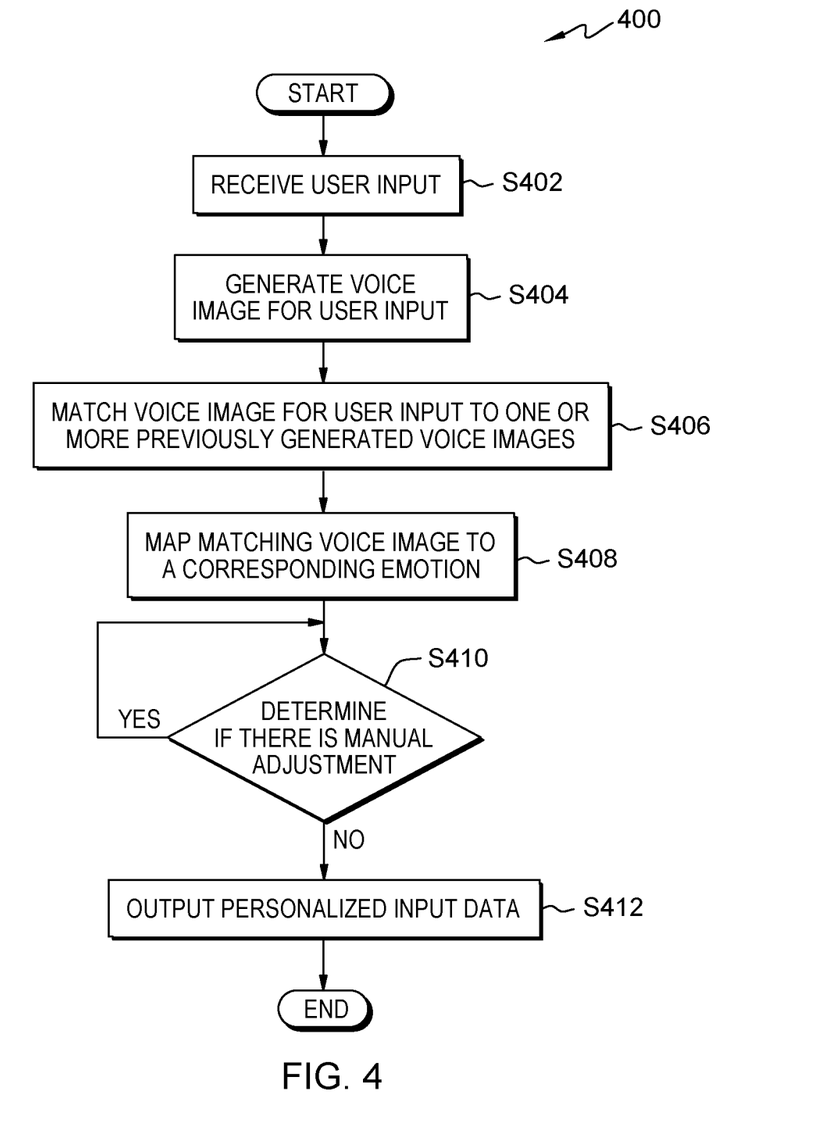
FIG. 4 is a flow chart diagram depicting operational steps for generating personalized output text or audio, generally designated 400, in accordance with at least one embodiment of the present invention.

FIG. 4 is a flow chart diagram depicting operational steps for generating personalized output text or audio, generally designated 400, in accordance with at least one embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

At step S402, linguistic analysis program 101 receives user input. In an embodiment the user input is audio or text.

At step S404, linguistic analysis program 101 generates a voice image for user input. In an embodiment, linguistic analysis program 101 generates a voice image based on the word line from the text. In an embodiment, linguistic analysis program 101 generates a voice image based on the word line, wave line, and pronunciation tags from the audio input. In an embodiment, linguistic analysis program 101 determines a matching image. In an embodiment, a matching image is a voice image that matches the current user input based, at least in part, on one or more of word lines, wave lines and pronunciation tags. In an embodiment, linguistic analysis program 101 determines a general image. In an embodiment, the general image is a voice image generated from the corresponding word line, wave line, and pronunciation tag from the user input. In an embodiment linguistic analysis program 101 determines a generated voice image matches a previously generated voice image is based, at least in part, on comparing the pronunciation tag and the wave line between the sentences associated with the generated voice image and the sentence associated with the previously generated voice image. In an embodiment linguistic analysis program 101 determines a generated voice image matches a previously generated voice image is further based, at least in part, on comparing similar words, sentence content, and emotions between the generated voice image and the previously generated voice image.

At step S406, linguistic analysis program 101 matches the voice image for the user input to one or more previously generated voice images. For example, linguistic analysis program 101 compares one or more of the word lines, wave lines, and pronunciation tags associated with the voice image corresponding to the user input to word lines, wave lines, and pronunciation tags associated with previously generated voice images stored in voice image database. In an embodiment, linguistic analysis program 101 selects a previously generated voice image having the highest degree of similarly to the voice image generated for the user input as a matching voice image.

At step S408, linguistic analysis program 101 maps the matching voice image to a corresponding emotion. In an embodiment, a previously generated voice image matching image is a voice image that matches the current user input based, at least in part, on one or more of word lines, wave lines and pronunciation tags. In an embodiment, linguistic analysis program 101 determines one or more emotional factors associated with particular voice image data, such as wave lines, stress accents, or pronunciation tags.

At decision step S410, linguistic analysis program 101 determines if there is manual adjustment. In an embodiment, manual adjustment occurs if a matching voice image has a degree of similarity below a predetermined threshold. In an embodiment, manual adjustment occurs if a particular feature of the matching voice image, such as the word line, wave line, or pronunciation tag has a degree of similarity below a predetermined threshold. In an embodiment, manual adjustment occurs if a matching voice image has a word line or portion thereof, wave line, or pronunciation tag that is not included in voice image database 132. If linguistic analysis program 101 determines there is manual adjustment (decision step S410 "YES" branch), linguistic analysis program 101 proceeds to step S410. If linguistic analysis program 101 determines if there is not manual adjustment (decision step S410 "NO" branch), linguistic analysis program 101 proceeds to step S412.

At step S412, linguistic analysis program 101 outputs personalized input data. In an embodiment, the personalized input data output to the user is audio, such that when played back to the user, emotes the particular emotion(s) corresponding to the input data. For example, linguistic analysis program 101 modifies the input audio to include the particular pitch (frequency), tone (waveform), loudness (amplitude) associated with a particular emotion. In an embodiment, the personalized input data output to the user is text. For example, linguistic analysis program 101 displays a voice image corresponding to the input audio as the user plays back the audio. In an embodiment, the personalized input data output to the user is text. In another example, linguistic analysis program 101 tags input text with emotion tags as the user reads the text.

Figure 5:
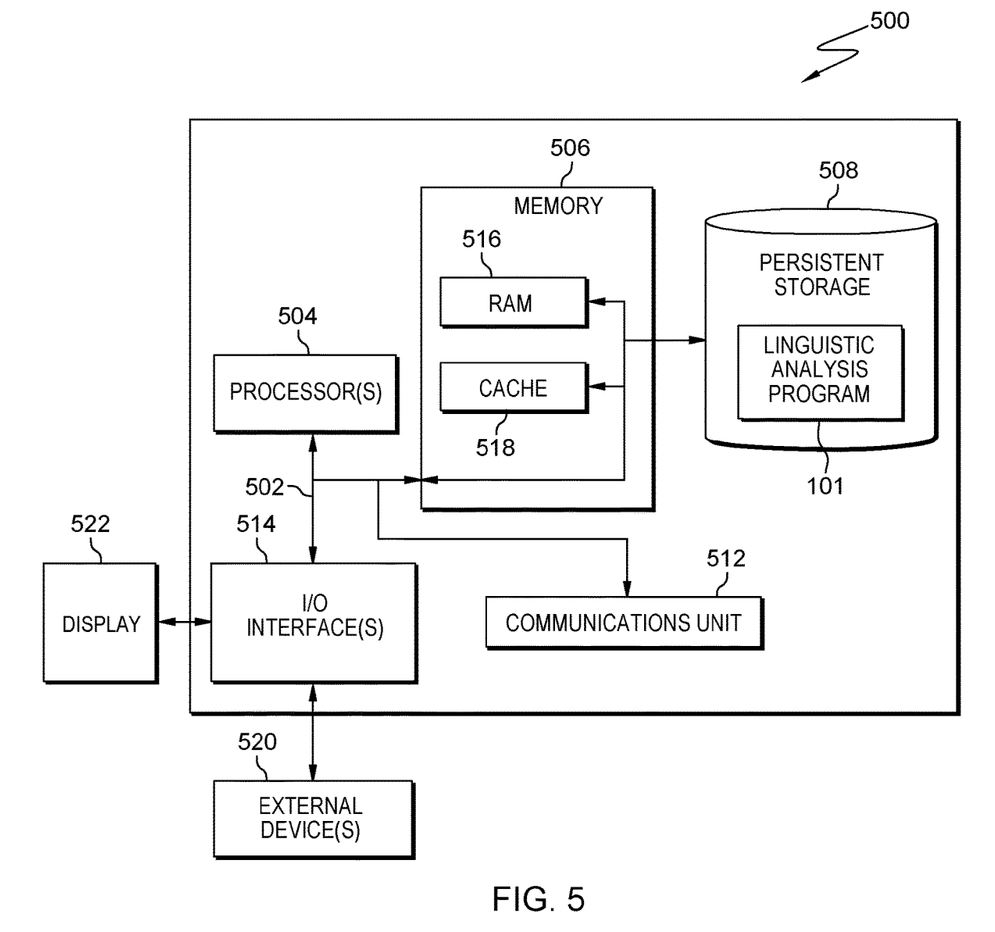
FIG. 5 is a block diagram depicting components of a computer, generally designated 600, suitable for executing a linguistic analysis program 101 in accordance with at least one embodiment of the present invention.

FIG. 5 is a block diagram depicting components of a computing device, generally designated 500, suitable for linguistic analysis program 101 in accordance with at least one embodiment of the invention. Computing device 500 includes one or more processor(s) 504 (including one or more computer processors), communications fabric 502, memory 506 including, RAM 516 and cache 518, persistent storage 508, which further includes linguistic analysis program 101, communications unit 512, I/O interface(s) 514, display 522, and external device(s) 520. It should be appreciated that FIG. 5 provides only an illustration of one embodiment and does not imply any limitations with regard to the environments in which different embodiments may be implemented. Many modifications to the depicted environment may be made.

As depicted, computing device 500 operates over communications fabric 502, which provides communications between computer processor(s) 504, memory 506, persistent storage 508, communications unit 512, and input/output (I/O) interface(s) 514. Communications fabric 502 can be implemented with any architecture suitable for passing data or control information between processor(s) 504 (e.g., microprocessors, communications processors, and network processors), memory 506, external device(s) 520, and any other hardware components within a system. For example, communications fabric 502 can be implemented with one or more buses.

Memory 506 and persistent storage 508 are computer readable storage media. In the depicted embodiment, memory 506 includes random-access memory (RAM) 516 and cache 518. In general, memory 506 can include any suitable volatile or non-volatile computer readable storage media.

Program instructions for linguistic analysis program 101 can be stored in persistent storage 508, or more generally, any computer readable storage media, for execution by one or more of the respective computer processor(s) 504 via one or more memories of memory 506. Persistent storage 508 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 can include one or more network interface cards. Communications unit 512 may provide communications through the use of either or both physical and wireless communications links. In the context of some embodiments of the present invention, the source of the various input data may be physically remote to computing device 500 such that the input data may be received, and the output similarly transmitted via communications unit 512.

I/O interface(s) 514 allows for input and output of data with other devices that may operate in conjunction with computing device 500. For example, I/O interface(s) 514 may provide a connection to external device(s) 520, which may be as a keyboard, keypad, a touch screen, or other suitable input devices. External device(s) 520 can also include portable computer readable storage media, for example thumb drives, portable optical or magnetic disks, and memory cards. Software and data used to practice embodiments of the present invention can be stored on such portable computer readable storage media and may be loaded onto persistent storage 508 via I/O interface(s) 514. I/O interface(s) 514 also can similarly connect to display 522. Display 522 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
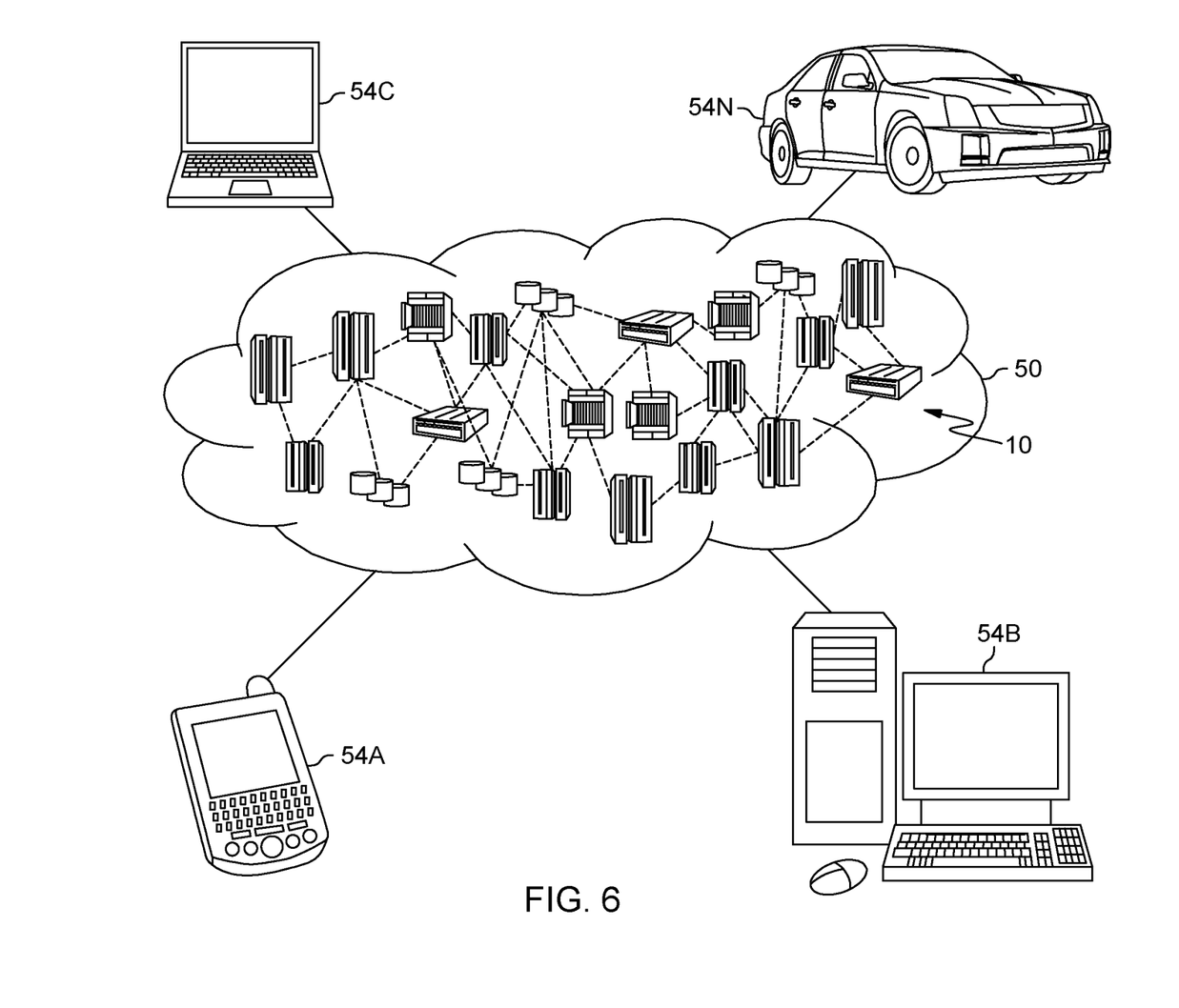
FIG. 6 is a block diagram depicting a cloud computing environment 50 in accordance with at least one embodiment of the present invention.

FIG. 6 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
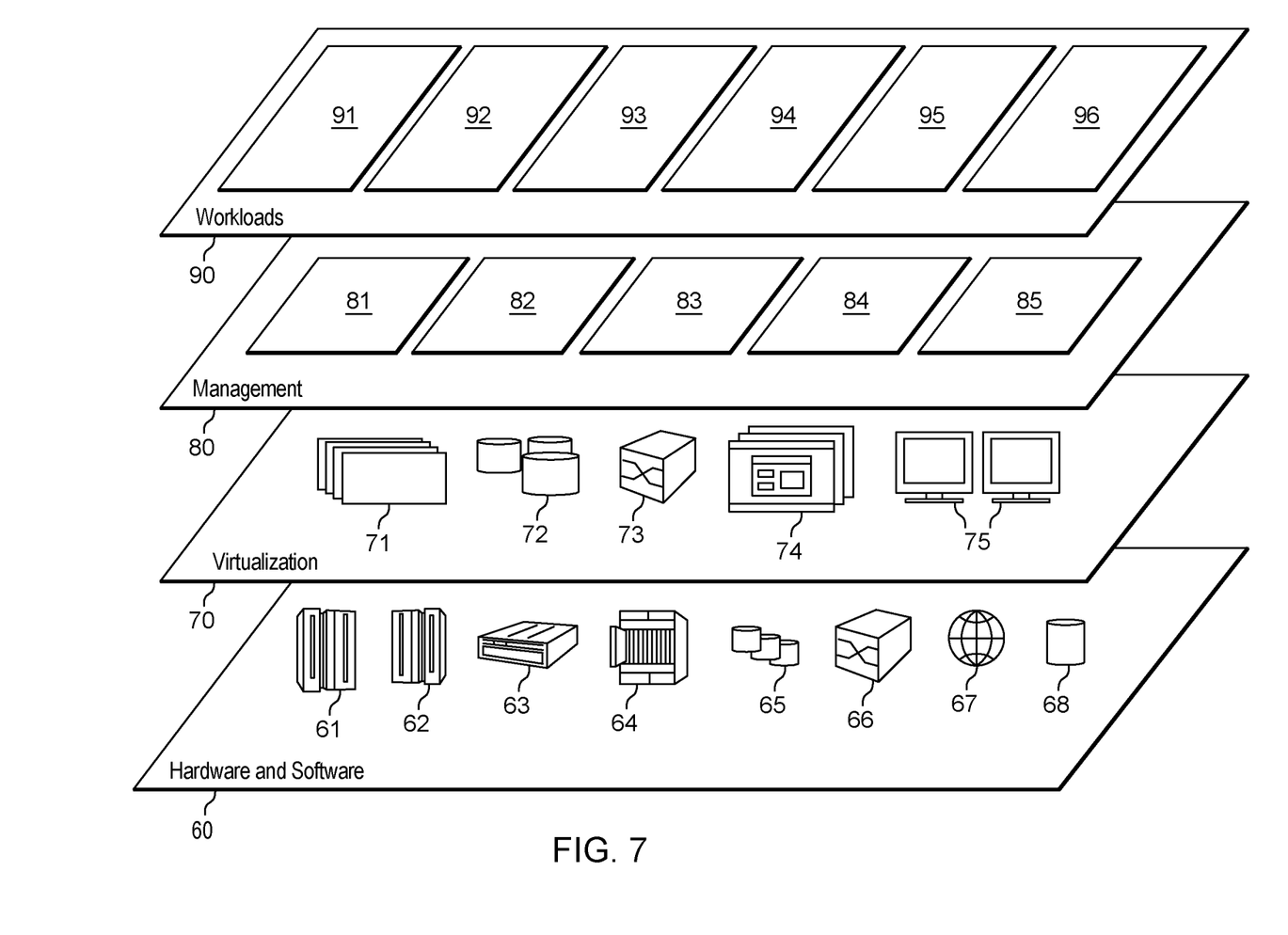
FIG. 7 is block diagram depicting a set of functional abstraction model layers provided by cloud computing environment 50 depicted in FIG. 6 in accordance with at least one embodiment of the present invention.

FIG. 7 is block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and linguistic analysis 96.

What is claimed is:

1. A computer-implemented method for generating personalized audio data, the computer-implemented method comprising:

receiving user input data, wherein the user input data is audio;

segmenting the user input data into a set of sentences, wherein segmenting the user input data into a set of sentences further includes converting the audio to text;

generating, for each sentence in the set of sentences, a voice image, wherein the voice image includes at least one pronunciation tag and a wave line associated with a sentence, and the wave line is a wavy line used to mark a height of intonation of each word of each sentence in the set of sentences, wherein the voice image is generated based on a volume and inflection point of each word in the sentence, and the volume is scaled to each other word in the sentence;

storing the voice image in a temporary table;

mapping, based on the wave line and the pronunciation tag, each sentence of the voice image to an emotion;

modifying the user input data based, at least in part on, the wave line and the pronunciation tag of the voice image, wherein the modifying includes generating an audio output based on the mapping, playing the output, and tagging each sentence of the input with the mapped emotion; and training a learning model with the voice image, wherein the training is configured to cause the learning model to generate speech based on the user input data, wherein the audio output includes the mapped emotion in text form.

2. The computer-implemented method of claim 1, wherein modifying the user input data is further based, at least in part, on:

mapping the user input data to an emotion; and modifying the user input data based on the mapped emotion.

3. The computer-implemented method of claim 1, further comprising:

matching the generated voice image to a previously generated voice image based, at least in part, on the previously generated voice image having a highest degree of similarity to the generated voice image.

4. The computer-implemented method of claim 3, wherein matching the generated voice image to a previously generated voice image is further based, at least in part, on comparing the pronunciation tag and the wave line between the sentences associated with the generated voice image and the sentence associated with the previously generated voice image.

5. The computer-implemented method of claim 1, further comprising:

displaying the generated voice image to a user as the modified user input data is played back to the user.

6. The computer-implemented method of claim 1, wherein matching the generated voice image to a previously generated voice image is further based, at least in part, on comparing similar words, sentence content, and emotions between the generated voice image and the previously generated voice image.

7. A computer program product for generating personalized audio data, the computer program product comprising one or more computer readable storage media and program instructions stored on the one or more computer readable storage media, the program instructions including instructions to:
receive user input data, wherein the user input data is audio;
segment the user input data into a set of sentences wherein segmenting the user input data into a set of sentences further includes converting the audio to text;
generate, for each sentence in the set of sentences, a voice image, wherein the voice image includes at least one pronunciation tag and wave line associated with a sentence and the wave line is a wavy line used to mark a height of intonation of each word of each sentence in the set of sentences, wherein the voice image is generated based on a volume and inflection point of each word in the sentence, and the volume is scaled to each other word in the sentence;
store the voice image in a temporary table;
map, based on the wave line and the pronunciation tag, each sentence of the voice image to an emotion;
modify the user input data based, at least in part on, the wave line and pronunciation tag of the voice image, wherein the modifying includes generating an audio output based on the mapping, playing the output, and tagging each sentence of the input with the mapped emotion; and
train a learning model with the voice image, wherein the training is configured to cause the learning model to generate speech based on the user input data, wherein the audio output includes the mapped emotion in text form.

8. The computer program product of claim 7, wherein instructions to modify the user input data is further based, at least in part, on instructions to:
map the user input data to an emotion; and
modify the user input data based on the mapped emotion.

9. The computer program product of claim 7, further comprising instructions to:
match the generated voice image to a previously generated voice image based, at least in part, on the previously generated voice image having a highest degree of similarity to the generated voice image.

10. The computer program product of claim 9, wherein the instructions to match the generated voice image to a previously generated voice image is further based, at least in part, on comparing.

11. The computer program product of claim 7, further comprising instructions to:
display the generated voice image to a user as the modified user input data is played back to the user.

12. The computer program product of claim 11, wherein the instructions to match the generated voice image to a previously generated voice image is further based, at least in part, on instructions to compare similar words, sentence content, and emotions between the generated voice image and the previously generated voice image.

13. A computer system for generating personalized audio data, comprising:
one or more computer processors;
one or more computer readable storage media; and
computer program instructions, the computer program instructions being stored on the one or more computer readable storage media for execution by the one or more computer processors, the computer program instructions including instructions to:
receive user input data, wherein the user input data is audio;
segment the user input data into a set of sentences, wherein segmenting the user input data into a set of sentences further includes converting the audio to text;
generate, for each sentence in the set of sentences, a voice image, wherein the voice image includes at least one pronunciation tag and wave line associated with a sentence and the wave line is a wavy line used to mark a height of intonation of each word of each sentence in the set of sentences, wherein the voice image is generated based on a volume and inflection point of each word in the sentence, and the volume is scaled to each other word in the sentence;
store the voice image in a temporary table;
map, based on the wave line and the pronunciation tag, each sentence of the voice image to an emotion;
modify the user input data based, at least in part on, the wave line and pronunciation tag of the voice image, wherein the modifying includes generating an audio output based on the mapping, playing the output, and tagging each sentence of the input with the mapped emotion; and
train a learning model with the voice image, wherein the training is configured to cause the learning model to generate speech based on the user input data, wherein the audio output includes the mapped emotion in text form.

14. The computer system of claim 13, wherein the instructions to modify the user input data is further based, at least in part, on instructions to:
map the user input data to an emotion; and
modify the user input data based on the mapped emotion.

15. The computer system of claim 13, further comprising instructions to:
match the generated voice image to a previously generated voice image based, at least in part, on the previously generated voice image having a highest degree of similarity to the generated voice image.

16. The computer system of claim 15, wherein the instructions to match the generated voice image to a previously generated voice image is further based, at least in part, on comparing.

17. The computer system of claim 13, further comprising instructions to:
display the generated voice image to a user as the modified user input data is played back to the user.

* * * * *